United States Patent [19]
Kondo et al.

[11] Patent Number: 4,729,578
[45] Date of Patent: Mar. 8, 1988

[54] VEHICLE SUSPENSION SYSTEM

[75] Inventors: Toshiro Kondo, Hiroshima; Tadanobu Yamamoto, Higashi-Hiroshima; Takeshi Edahiro, Hiroshima, all of Japan

[73] Assignee: Mazda Motor Corporation, Hiroshima, Japan

[21] Appl. No.: 42,447

[22] Filed: Apr. 24, 1987

[30] Foreign Application Priority Data

Apr. 25, 1986 [JP] Japan .................. 61-94741
Apr. 25, 1986 [JP] Japan .................. 61-94742
Apr. 25, 1986 [JP] Japan .................. 61-94746

[51] Int. Cl.$^4$ ............................................. B60G 3/06
[52] U.S. Cl. ..................... 280/690; 280/691; 280/724
[58] Field of Search ............ 280/688, 690, 702, 724, 280/725, 691

[56] References Cited

U.S. PATENT DOCUMENTS

| | | | |
|---|---|---|---|
| 4,245,853 | 1/1981 | Inoue et al. | 280/725 |
| 4,478,430 | 10/1984 | Maebayashi et al. | 280/690 |
| 4,511,160 | 4/1985 | Inoue | 280/690 |
| 4,513,990 | 4/1985 | Morita et al. | 280/725 |
| 4,588,205 | 5/1986 | Gaiser | 280/725 |
| 4,621,830 | 11/1986 | Kanai | 280/675 |

FOREIGN PATENT DOCUMENTS 60-148707 8/1985 Japan .

*Primary Examiner*—John J. Love
*Assistant Examiner*—Kenneth R. Rice
*Attorney, Agent, or Firm*—Fleit, Jacobson, Cohn & Price

[57] ABSTRACT

A vehicle suspension system including a wheel hub on which a wheel is rotatably mounted, a pair of lateral link substantially transversely extending and disposed in a spaced relationship with each other in the longitudinal direction of the vehicle, the lateral link being pivotally connected to the vehicle body at the inner end and to the wheel hub at the outer end thereof so that the wheel hub can be swingably moved in the vertical direction relative to the vehicle body, in which at least one of the lateral link is divided into an inner and outer link members, the inner link member being connected to the outer link member by a connector including a precompressed resilient member constituted to be deflected in the axial direction of the lateral links when the compressive force is applied to the resilient member beyond the precompressed force so as to reduce the length of the lateral link member. There are produced different deflection properties between the two lateral links when the side force acts on the wheel to cause toe direction changes of the wheel.

19 Claims, 16 Drawing Figures

VEHICLE SUSPENSION SYSTEM

BACKGROUND OF THE INVENTION

1. Field of the Invention

The present invention relates to a vehicle suspension system and more particularly to a rear suspension system provided with lateral links of a unique structure thereby enabling a desirable toe control of a rear wheel.

2. Description of the Prior Art

In a rear suspension system, it is desirable that a toe control property is determined so as to change non-linearly in accordance with the magnitude of side forces acted on rear wheels as described in Japanese Patent Public Disclosure Nos. 60-148707, and 60-14708, which are filed on Jan. 13, 1984, laid-open to the public an Aug. 6, 1985 and corresponding to U.S. Pat. No. 4,513,990. It should however be noted that the desirable toe control property depends on types of the vehicle, such as front-engine-front-drive(so called FF type), and front-engine-rear-drive( FR type) and on how to tune the performance of drivability and the like.

There has been known a suspension system in which resilient properties of rubber bushegs provided at connecting portions of lateral links are tuned to be deflected so as to provide desirable properties. For this purpose, the rubber bushes should be deformed in accordance with non-linear properties when the side force acts on the wheels. However, since the bushes are deformed or deflected torsionally as a result of a movement of the wheels in the vertical or up-and-down direction, as a matter of fact, it is difficult to provide the bushes with the desirable deflecting properties as to the deflection in the axial direction of the lateral link in order to obtain a desirable toe direction change property in view of durability and the like.

SUMMARY OF THE INVENTION

It is an object of the present invention to provide a suspension system by which a desirable toe control can be accomplished.

It is another object of the invention to provide a rear suspension system with a unique lateral link which deflects in accordance with a certain non-linear property so that a non-linear toe direction change property can be obtained when the side force acts on the wheels.

According to the present invention, there is provided with a vehicle suspension system including a wheel supporting means on which a wheel is rotatably mounted, a pair of lateral link means substantially transversely extending and disposed in a spaced relationship with each other in the longitudinal direction of the vehicle, the lateral link means being pivotally connected to the vehicle body at the inner end and to the wheel supporting means at the outer end thereof so that the wheel supporting means can be swingably moved in the vertical direction relative to the vehicle body, in which at least one of the lateral link means is divided into an inner and outer link members, the inner link member being connected to the outer link member by a connecting means including a precompressed resilient member constituted to be deflected in the axial direction of the lateral link means when the compressive force is applied to the resilient member beyond the precompressed force so as to reduce the length of the lateral link member.

It will therefore be understood that the length of the lateral link means changes in accordance with a certain nonlinear property to produce a toe direction change of the wheel.

It is considered that the side force which acts on the wheels is much smaller in an operation on a straight path than in an operation for a fast turning or a lane change wherein a large side force is produced. In fact, the side force under an operation in a straight path is smaller than that under a slow speed turning wherein the side force is relatively small. In a preferable aspect of the present invention, deflecting properties against the side force are different between the front and rear lateral link means wherein the toe direction changes as the side force changes in a manner that the toe-in trend is increased as the side force is increased in a middle range of the magnitude of the side force compared with that in a small and large ranges thereof. In this case, the toe direction of a rear wheel is controlled under a side force acting on the wheel wherein the turning property can be improved under a relatively small side force but a steering stability can be maintained under a relatively large side force and the stability in a straight vehicle operation can be improved under a fairy small side force.

The above and other objects and features of the present invention will become apparent from the following descriptions of preferred embodiments taking reference to the accompanying drawings.

BRIEF DESCRIPTION OF THE DRAWINGS

FIG. 10 is a diagram showing deflection property in accordance with the embodiment of FIG. 8 with regard to the front and rear lateral links in the axial direction thereof when an external force is applied threre to;

DESCRIPTION OF THE PREFERRED EMBODIMENTS

Figure 1:
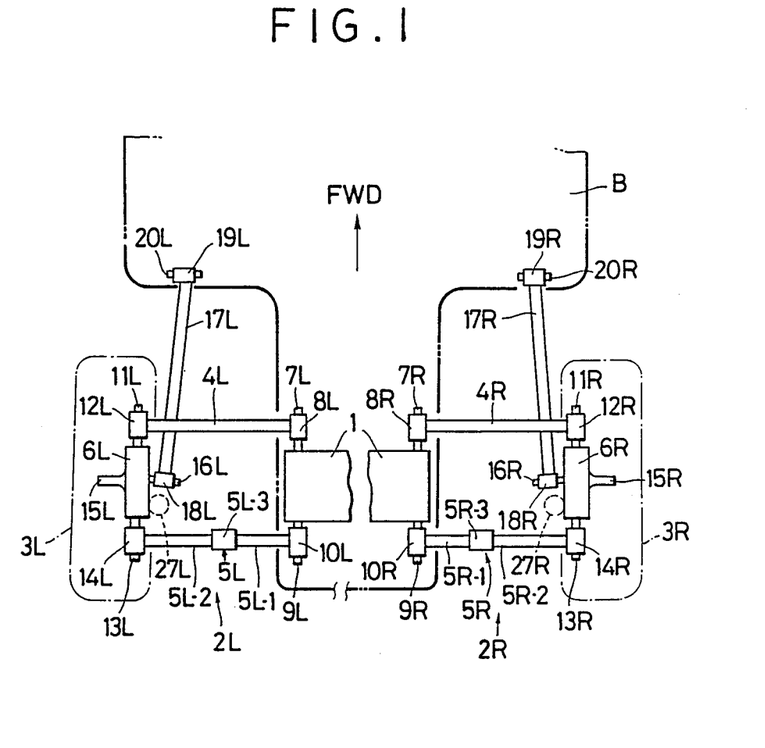
FIG. 1 is a fragmentary plan view of a vehicle rear suspension system embodying the features of the present invention.

Referring to the drawings, particularly to FIG. 1, there is shown a rear suspension system of a FF type automobile to which the present invention is applied. The left and right suspension mechanisms are symmetrical with each other so that corresponding parts are designated by the same reference numerals with a suffix L for the left hand mechanism and a suffix R for the right hand mechanism. Further, descriptions will be made only for the right mechanism and the descriptions for the left mechanism will be omitted unless it is necessary.

Referring to FIG. 1, the vehicle has a body B provided with a rear sub-frame 1 which is connected through a suspension mechanism 2R with a rear wheel 3R. The suspension mechanism 2R comprises a front lateral link 4R and a rear lateral link 5R which extend in a lateral direction of the vehicle body B. The wheel 3R is supported for rotation about a rotation axis by a wheel support or a wheel hub 6R which has a spindle 15R for rotatably supporting the wheel 3R.

The front lateral link 4R is connected at the laterally inner end with a pin 7R on the sub-frame 1 through a rubber bush 8R. The laterally outer end of the front lateral link 4R is connected with a pin 11R on the wheel support 6R through a rubber bush 12R. Similarly, the rear lateral link 5R is connected at a laterally inner end with a pin 9R on the sub-frame 1 through a rubber bush 10R. The laterally outer end of the link 5R is connected with a pin 13R on the wheel hub 6R through a rubber bush 14R. In the embodiment shown in FIG. 1, the front and rear lateral links 4R and 5R are substantially parallel with each other and the spindle 15R for supporting the wheel 3R is located at the substantially middle point of the distance between the outer ends of the links 4R and 5R so that a side force acted on the wheel 3R is transmitted to the links 4R and 5R uniformly in the axial direction thereof through the spindle 15. It will be noted in FIG. 1 that the pins 7R, 9R, 11R and 13R and the rubber bushes 8R, 10R, 12R and 14R have their axes arranged substantially in the longitudinal direction of the vehicle body B. Therefore, the rear wheel 3R is vertically swingable with respect to the vehicle body B.

A tension rod 17R is provided to extend substantially in the longitudinal direction of the vehicle body B. The tension rod 17R has a rear end which is connected with a pin 16R on the wheel hub 6R through a rubber bush 18R. The front end of the tension rod 17R is connected with a pin 20R on the vehicle body B through a rubber bush 19R. The pins 16R and 20R and the rubber bushes 18R and 19R have axes extending substantially in the transverse or lateral direction with respect to the vehicle body B so that they do not disturb the vertical swinging movement of the wheel 3R. As well known in the art, a strut assembly 27R is provided between the vehicle body and the wheel hub 6R.

The rear lateral link 5R includes an inner link rod 5R1 and an outer link rod 4R-2 which are connected together by means of a connector 5R-3. There are shown deflection properties of a front lateral link assembly including the bush 8R and 12R and rear lateral link assembly including the bush 10R and 14R by lines F and R respectively in FIG. 4.

Figure 5:
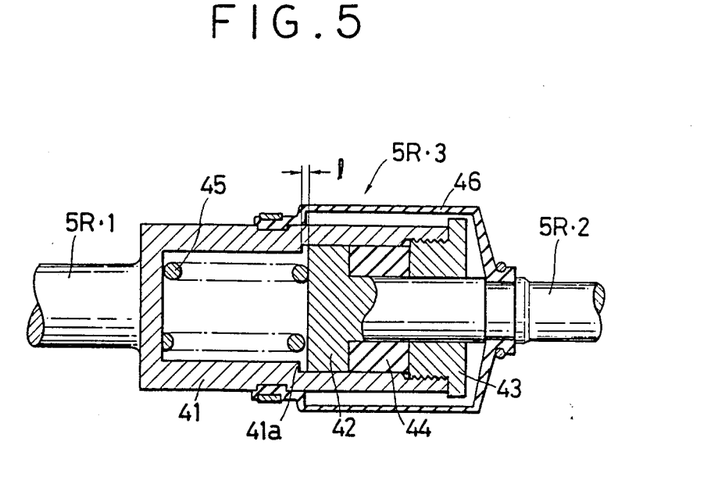
FIG. 5 is an axial sectional view of the connector incorporated into the links.

There is shown the structure of the connector 5R-3 in FIG. 5. The connector 5R includes an outer cylindrical case 41 integral with the outer end of the inner link rod 5R-1 and a piston 42 integral with the inner end of the outer link rod 5R-2. The piston 42 is disposed in the case 41 for axially slidable movement. The case 41 has an open outer end which is closed by an end cap 43 which is brought into meshing engagement with the case 41. Between the end cap 43 and the piston 42, there is a cylindrical rubber member 44. A precompressed coil spring 45 is provided for biasing the piston 42 laterally outwardly of the vehicle body. It will be understood that the precompression of the coil spring 45 can be changed in accordance with the position of the cap 43. When the external force acting on the the link 5R excceeds the magunitude of the precompression, the lateral link 5R deflects in the axial direction thereof so that the length of the link 5R changes in accordance with the magnitude of the external force. The cylindrical case is formed with a stepped shoulder 41a at an axial intermediate portion. The piston 42 has a gap 1 with respect to the shoulder 41a when the external force is not applied to the lateral link assembly 5R. When the piston 42 move to abut the shoulder 41a, a further movement of the piston 42 is limited.

The connector 5R-3 is covered with a cover 42 which is preferably constituted by a resilient plastic member.

Figure 6:
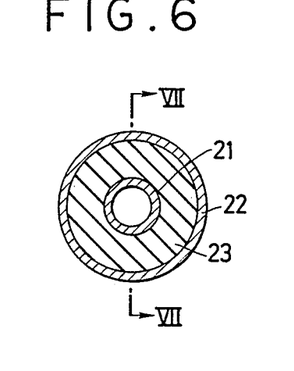
FIG. 6 is a cross-sectional view of the rubber bush used in the connection between the link and the wheel support.
Figure 7:
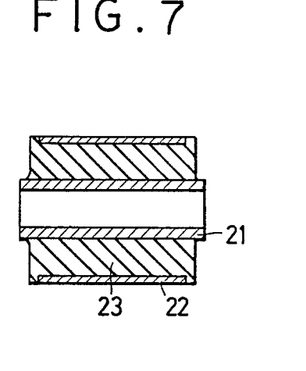
FIG. 7 is an axial sectional view of the rubber bush shown in FIG. 6 taking along a line XII—XII.

As shown in FIG. 6 and 7, the bushes 8R, 10R, 12R, and 14R include an inner sleeve 21 with which pins 7R, 9R, 11R, and 13R are engaged, an outer sleeve 22 to which the link 4R and 5R are connected and a rubber member of a certain rigidity 23 disposed therebetween. the bush 12R and 14R are provided with rubber members 23 of the substantially same rigidities to produce the substantially same deflection properties. While the rubber material in the bush 8R at the inner end of the front lateral 4R is softer than that in the bush 10R at the inner end of the rear lateral link 5R.

Figure 4:
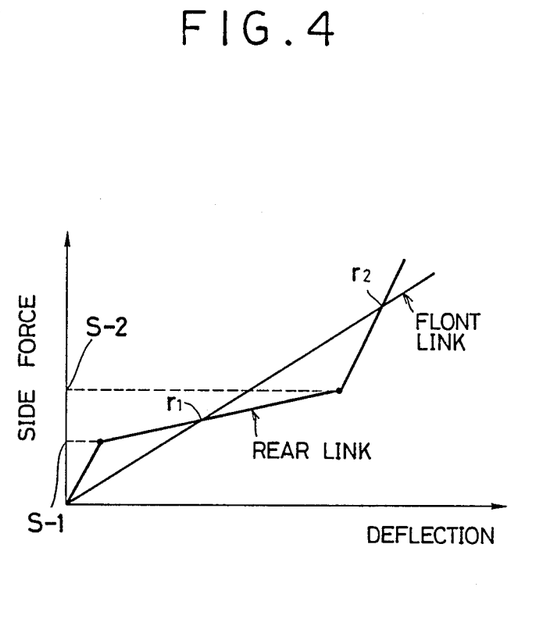
FIG. 4 is a diagram showing the relationship between the side force and the deflection of assemblies of front and rear links.

In FIG. 4, The properties F and R show the deflections of the front and rear lateral link assemblies respectively. The deflection rate of the rear lateral link assembly is ralatively small when the side force acting on the wheel 3R is smaller than a value S-1. When the side force is in the range of a value between S-1 and S-2, the deflection rate is increased in comparison with the range of the side force less than S-1. Further when the side force is increased beyond the value S-2, the deflection rate of the link assembly is decreased again. On the other hand, the deflection property F is substantially linear. The deflection curves F and R intersect at two points r1 and r2 wherein the amount of the deflection of the front lateral link assembly 4R is larger than that of the rear lateral link assembly 5R when the side force is smaller than the value r1 and larger than the value r2, but between r1 and r2, the deflection of the rear lateral link assembly 5R is larger than that of the front lateral link assembly 4R. The value r1 of side force corresponds to the precompression for the coil spring 45. The rigidities of the rubber materials of bushes 12R and 14R define the gradients of the curve R in the range less than S-1 and larger than S-2.

Figure 2:
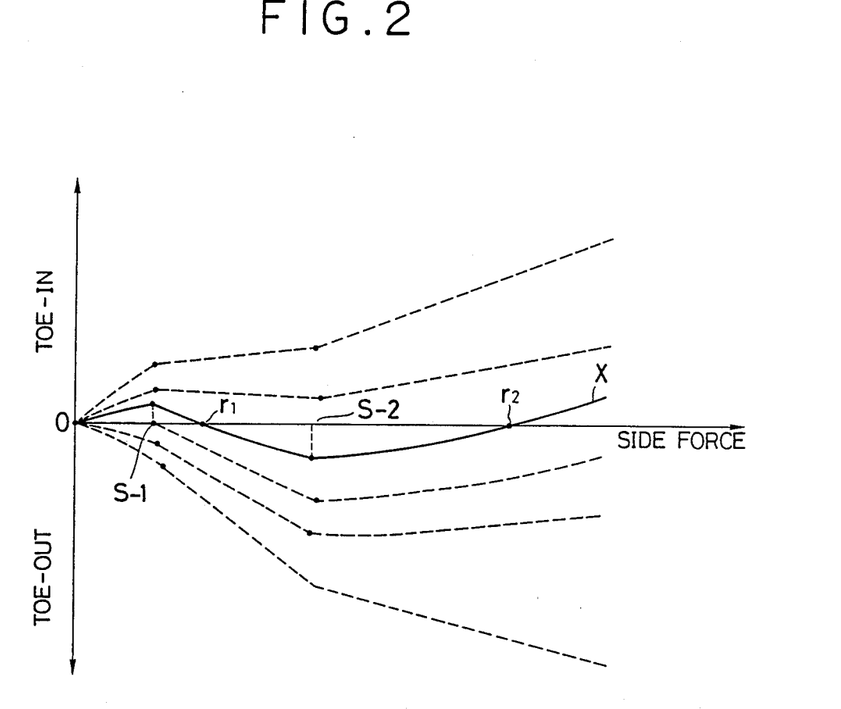
FIG. 2 is a diagram showing several types of wheel toe direction changes.

In FIG. 2, there is shown a change of the toe direction of the wheel 3R by a property X wherein the S-1, S-2, r1 and r2 correspond to those in FIG. 4.

Figure 3:
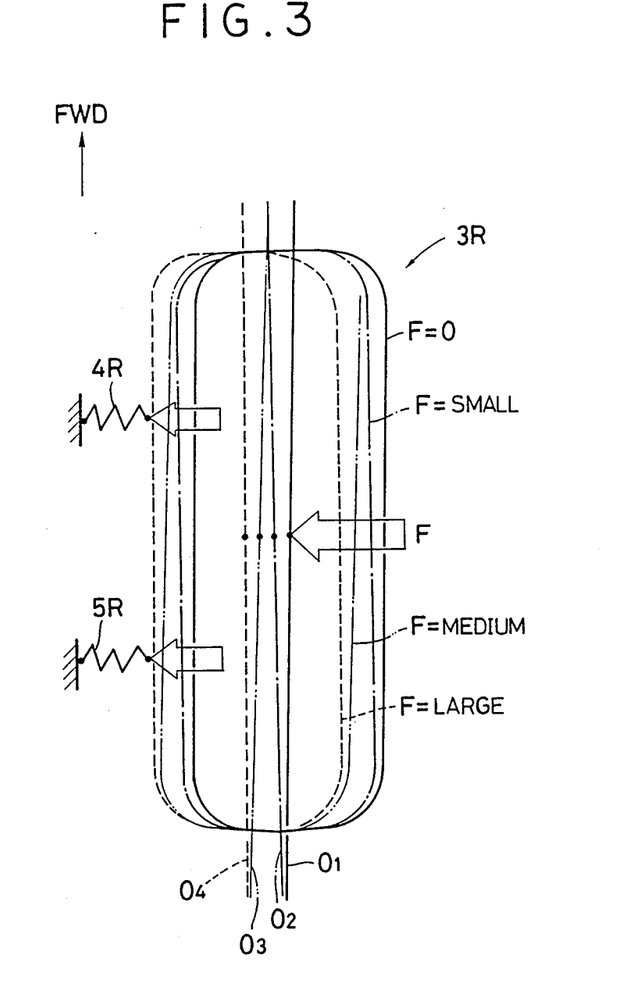
FIG. 3 is a plan view of the rear wheel in the suspension system in FIG. 1 showing the movements of the wheel under the side force.

Referring to FIG. 3, it will be noted that the side force F acts on the rear right wheel 3R form the road surface laterally inwardly as the vehicle passes a leftwardly curved path. In other words, the side force is produced to act on the laterally outboard wheel in the laterally inward direction. The solid line F=0 shows the position of the wheel where the wheel is not subjected to a side force. At this instance, the center plane of the wheel is located to a position shown by a line $0_1$. When the wheel is subjected to a side force of a small value, the wheel is shifted to the position shown by a broken line F=small. Thus, a toe-in movement is produced in the wheel. The center plane of the wheel is located at a position shown by a line $0_2$. When the wheel is subjected to a side force of a medium value, the wheel is shifted to the position shown by a broken line F=medium to produce a toe-out movement. The center plane of the wheel is located at a position shown by a line $0_3$. When the side force is large, the wheel is shifted to the position shown by a dotted line F=large to produce a toe-in movement. The center plane of the wheel is located at a position shown by a line $0_4$ in FIG. 3.

It will be noted in FIG. 3 that the rear wheel 3R is directed straight forward when the wheel is not subjected to a side force. When the wheel is subjected to a side force of a small value, the assembly of the front link 4R is deflected by a greater extent than in the assembly of the rear link 5R. This will cause a toe-in movement of the wheel as described above to thereby ensure a running stability on a straight road. Under a side force of a medium value, the assembly of the front link 4R deflects by a smaller extent than in the assembly of the rear link 5R. Therefore, a toeout movement is produced in the wheel 3R so that a turning operation of a small radius is made possible. Under a side force of a large value, the deflection of the front link assembly 4R again becomes larger than that in the rear lateral link assembly 5R. Thus, a toe-in movement is produced in the wheel ensuring a running stability under a high speed cornering or in a lane changing operation.

Figure 8:
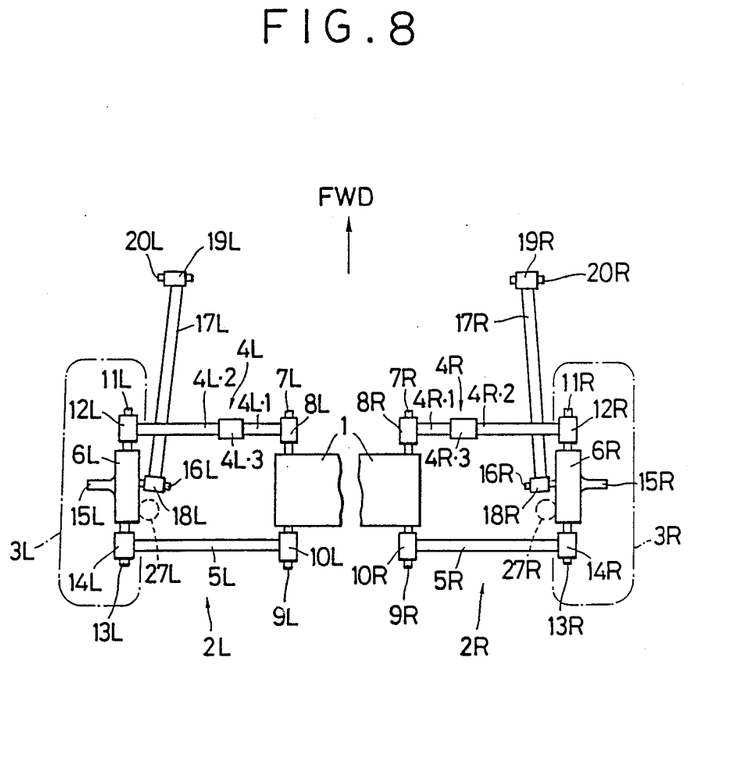
FIG. 8 is a fragmentary plan view similar to FIG. 1 but showing a rear suspension mechanism in accordance with another embodiment of the present invention.
Figure 9:
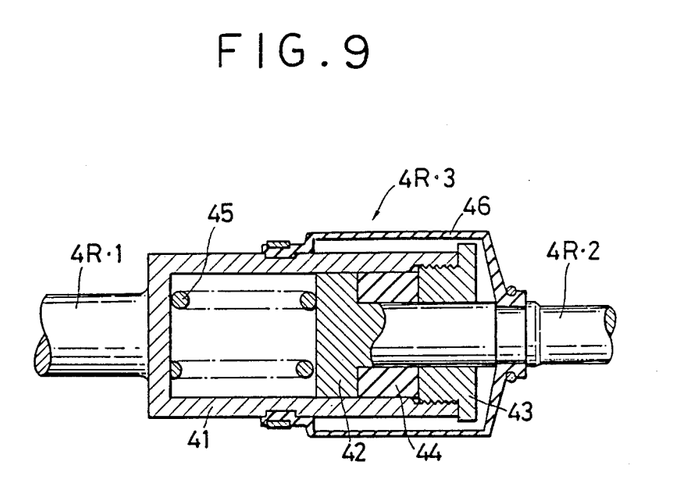
FIG. 9 is a sectional view of a connector employed in the suspension system of FIG. 8.

Referring to FIGS. 8 through 12, there is described another embodiment of the present invention. in the description of this embodiment, the same conponents as those in the former embodiment are referred by the same numerals and explanations thereto are omitted. In FIG. 8, the assembly of the front link 4R is divided into an inner link rod 4R-1 and an outer link rod 4R-2. The inner and outer link rods 4R-1 and 4R-2 are connected through a connetor 4R3. As shown in FIG. 9, the connector 4R-3 has a similar structure to the connector 5R-3 explained in connection with FIG. 5. However the connector 4R-3 is not provided with any shoulder portion while the connector 5R-3 includes the shouler 41a on the inner wall of the cylindrical member 41. As a result, the connector 4R-3 has a different deflection property from the connector 5R-3 in the former embodiment.

Figure 10:
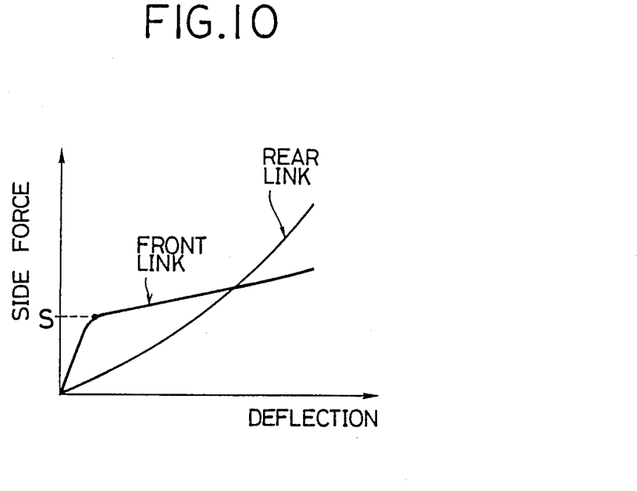

The properties F and R show the deflections of the front and rear lateral link assemblies 4R and 5R respectively. In this embodiment, the bush 12R and 14R are provided with rubber members 23 of the substantially same rigidities to produce the substantially same deflection properties. While the rubber material in the bush 8R at the inner end of the front lateral 4R is harder than that in the bush 10R at the inner end of the rear lateral link 5R. The deflection properties of the assemblies of the front and rear link 4R and 5R are determined as described hereinafter. In the property F, the deflection rate of the assembly of the front lateral link 4F is ralatively large when the side force acting on the wheel 3R is samller than a value S. But, when the side force is increased beyond the value S, the deflection rate of the link assembly 4R is decreased. On the other hand, the deflection property R for the rear lateral link assembly 5R is substantially linear. The deflection curves F and R intersect at one point so that the amount of the deflection of the rear lateral link assembly 5R is larger than that of the front lateral link assembly 4R when the side force is smaller than the value at the intersection, but when the side force increased beyond the value at the intersection, the deflection of the front lateral link assembly 4R is larger than that of the rear lateral link assembly 5R. The value of side force at the intersection corresponds to the precompression for the coil spring 45. The rigidity of the rubber material fo bush 10R defines the gradient of the curve R in the range of less than S.

Figure 11:
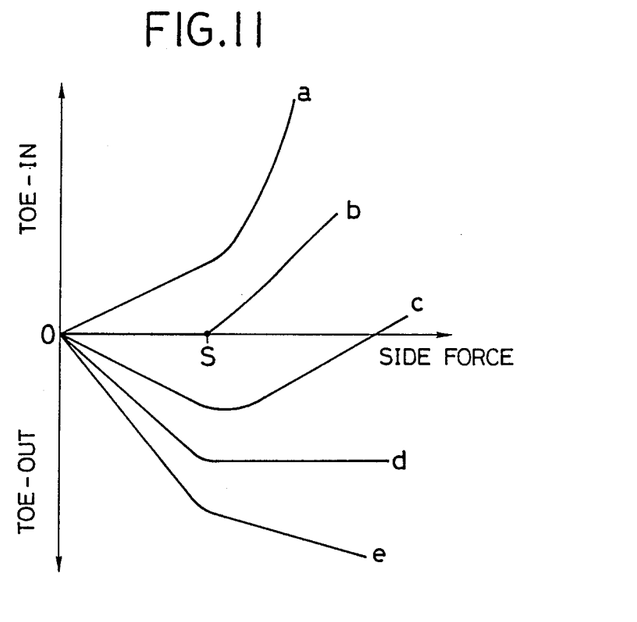
FIG. 11 is a diagram showing several types of toe direction changes of the wheel in accordance with the embodiment of the present invention of FIGS. 8 and 9.

In FIG. 11, there are shown typical change properties a, b, c, d, e of the toe direction of the wheel 3R in accordance with the present invention.

Figure 12:
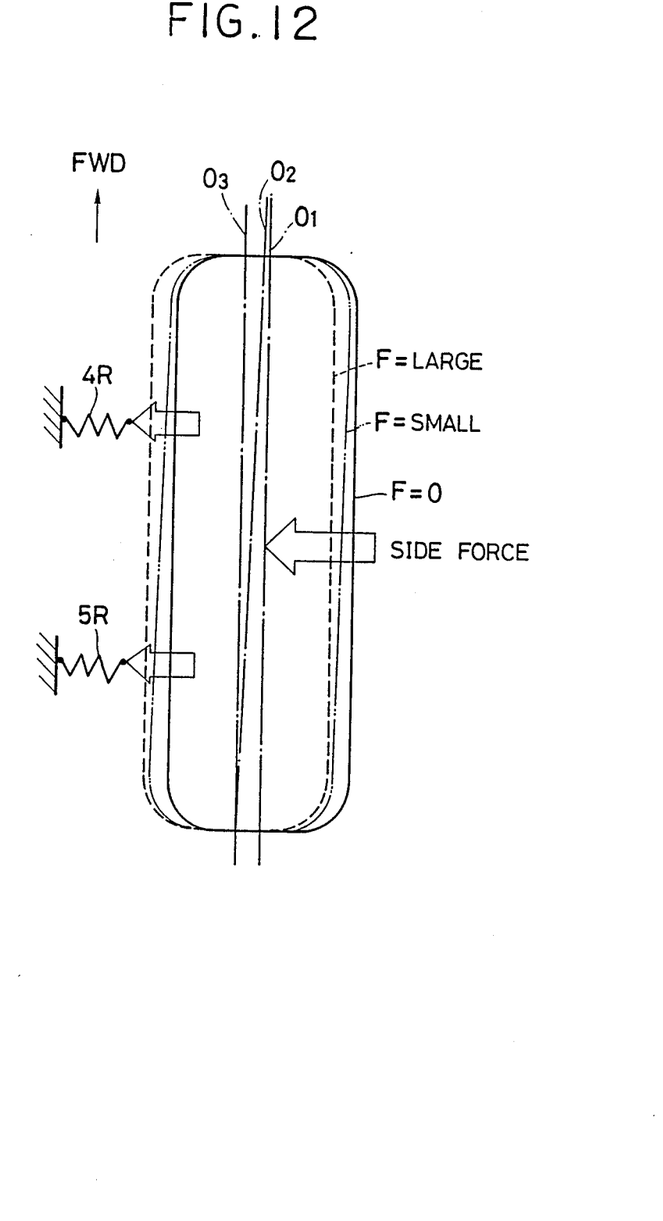
FIG. 12 is a plan view of the rear wheel showing a relationship between the toe direction changes and the side force in accordance with the embodiment of FIGS. 8 and 9.

Referring to FIG. 12, with regard to the property c in FIG. 11, it will be noted that the side force F acts on the rear right wheel 3R form the road surface laterally inwardly as the vehicle passes a leftwardly curved path. In other words, the side force is produced to act on the laterally outboard wheel in the laterally inward direction. The solid line F=0 shows the position of the wheel where the wheel is not subjected to a side force. At this instance, the center plane of the wheel is located to a position shown by a line $0_1$. When the wheel is subjected to a side force of a small value, the wheel is shifted to the position shown by a broken line F=small. Thus, a toe-out movement is produced in the wheel. The center plane of the wheel is located at a position shown by a line $0_2$. When the side force is large, the wheel is shifted to the position shown by a dotted line F=large to produce a toe-in movement. The center plane of the wheel is located at a position shown by a line $0_3$ in FIG. 10.

It will be noted in FIG. 12 that the rear wheel 3R is directed straight forward when the wheel is not subjected to a side force. When the wheel is subjected to a side force of a small value, the assembly of the front link 4R is deflected by a smaller extent than in the assembly of the rear link 5R. This will cause a toe-out movement of the wheel as described above to thereby ensure a running stability on a straight road and to improve a drivablity under the smaller side force. Under a side force of a large value, the deflection of the assembly of the front link 4R becomes larger than that in the rear link 5R. Thus, a toein movement or an understeer trend is produced in the wheel ensuring a running stability in a high speed cornering.

Figure 13:
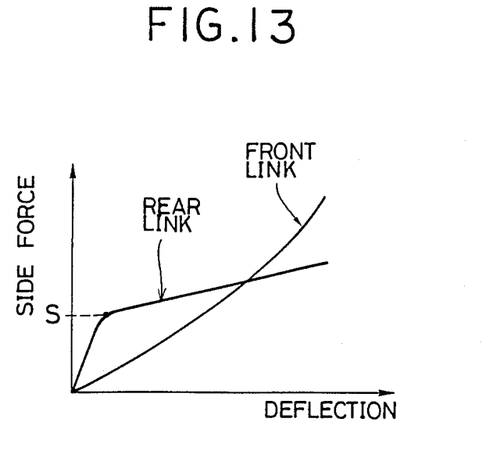
FIG. 13 is a diagram showing deflection properties of the assemblies of the front and rear lateral links in the axial direcion thereof in accordance with still another embodiment of the present invention.

With regard to still further embodiment of the present invention, a description is followed hereinafter taking reference with FIGS. 13, 14 and 15.

In this embodiment, the rear lateral link 5R is divided into the inner link rod 5R-1 and outer link rod 5R-2 as described in connction with FIG. 1. But the connector 5R-3 has the same structure as the 4R-3 in FIG. 9. The bush 12R and 14R are provided with rubber members 23 of the substantially same rigidities to produce the substantially same deflection properties. While the rubber material in the bush 8R at the inner end of the front lateral link 4R is softer than that in the bush 10R at the inner end of the rear lateral link 5R. the deflection properties of the assemblies of the front and rear link 4R and 5R are determined as described hereinafter. In the property R, the deflection rate of the rear lateral link assembly 5R is ralatively large when the side force acting on the wheel 3R is samller than a value S. But, when the side force is increased beyond the value S, the deflection rate of the link assembly 5R is decreased. On the other hand, the deflection property F for the rear lateral link assembly 4R is substantially linear. The deflection curves F and R intersect at one point wherein the amount of the deflection ofthe front lateral link assembly 4R is larger than that of the rear lateral link assembly 5R when the side force is smaller than the value at the intersection, but when the side force increased beyond the value at the intersection, the deflection of the rear lateral link assembly 5R is larger than that of the front lateral link assembly 4R. The value of side force at the intersection corresponds to the precompression for the coil spring 45. The rigidity of the rubber material of bush 10R defines the gradient of the curve R in the range of less than S.

Figure 14:
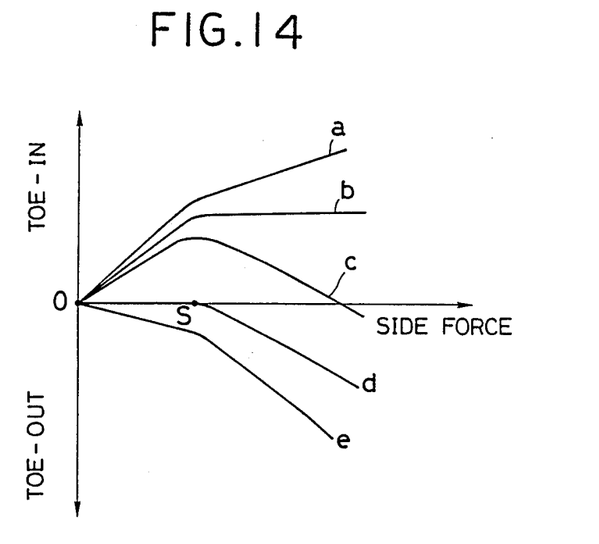
FIG. 14 is a diagram showing several types of toe direction change properties of the embodiment of FIG. 13.

In FIG. 14, there are shown typical change properties a, b, c, d, e of the toe direction of the wheel 3R in accordance with the present invention.

Figure 15:
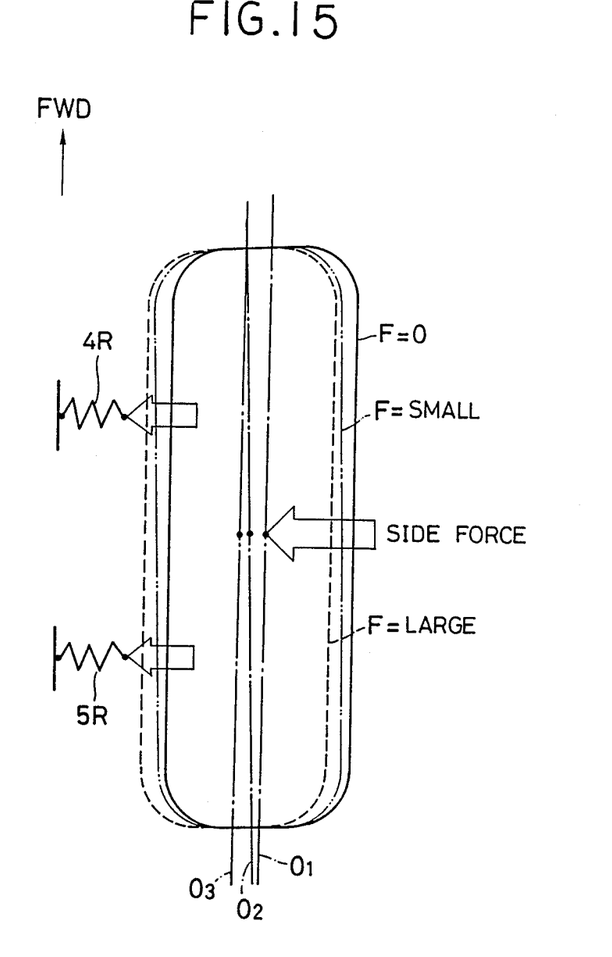
FIG. 15 is a plan view of a vehicle rear suspension mechanism showing the example of FIGS. 13 and 14 to which the present invention can be applied.

Referring to FIG. 15, with regard to the property c, it will be noted that the side force F acts on the rear right wheel 3R form the road surface laterally inwardly as the vehicle passes a leftwardly curved path. In other words, the side force is produced to act on the laterally outboard wheel in the laterally inward direction. The solid line F=0 shows the position of the wheel where the wheel is not subjected to a side force. At this instance, the center plane of the wheel is located to a position shown by a line $0_1$. When the wheel is subjected to a side force of a small value, the wheel is shifted to the position shown by a broken line F=small. Thus, a toe-in movement is produced in the wheel. The center plane of the wheel is located at a position shown by a line $0_2$. When the side force is large, the wheel is shifted to the position shown by a dotted line F=large to restrict a toe-in movement. The center plane of the wheel is located at a position shown by a line $0_3$ in FIG. 15.

It will be noted in FIG. 15 that the rear wheel 3R is directed straight forward when the wheel is not subjected to a side force. When the wheel is subjected to a side force of a small value, the assembly of the front link 4R is deflected by a larger extent than in the assembly of the rear link 5R. This will cause a toe-in movement of the wheel as described above to thereby ensure a running stability on a straight road. Under a side force of a large value, the deflection of the assembly of the rear link 5R becomes larger than that in the front link 4R. Thus, a toe-in movement or an understeer trend is restricted in the wheel to improve a turning operability. In other words, a small turning radius can be obtained in a turning operation.

Figure 16:
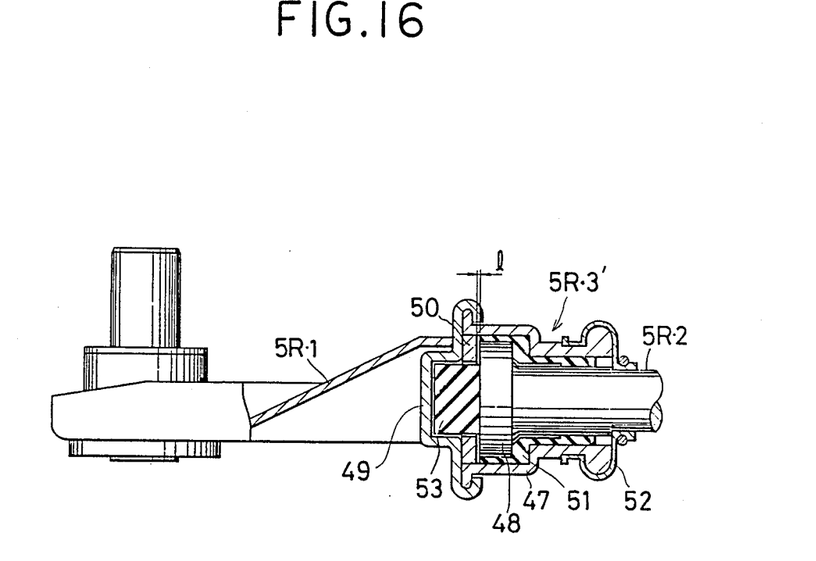
FIG. 16 is an axial sectional view showing another example of the connector to which the present invention can be applied.

Now referring to FIG. 16, there is shown another embodiment of the connector 5R-3'. The connector 5R-3' includes an outer cylindrical case 47 integral with the outer end of the inner link rod 5R-1 and a piston 48 integral with the inner end of the outer link rod 5R-2. The piston 48 is disposed in the case 47 for axially slidable movement. The case 47 has an open outer end which is closed by an end cap 49. Between the end cap 49 and the piston 48, there is a cylindrical resin bush 50. Another resin bush 51 is disposed between the piston 48 and the case 47. The inner side of the connector 5R-3' is covered with a flexible resin cover 52. A precompressed resilient rubber material 53 is provided for biasing the piston 48 laterally outwardly of the vehicle body.

It will be understood that the precompression of the rubber material 53 can be changed in accordance with the position of the cap 49. When the external force acting on the the link 5R excceeds the magunitude of the precompression, the lateral link 5R deflects in the axial direction thereof so that the length of the link 5R changes in accordance with the magnitude of the external force. There is formed a gap 1 between the piston 48 and the resin bush 50 when the external force is not applied to the lateral link assembly 5R. When the piston 48 move to abut the resin bush 50, a further movement of the piston 48 is limited.

The connector 5R-3' in FIG. 16 can be applied for the supension system of the present invention as well as the connector 5R-3 described in connection with FIG. 5.

The present invention can be applied to not only FF type vehicle but also FR type vehicle.

Further the present invention can be applied to any type of suspension system as long as the supension is provided with a pair of lateral links disposed in a spaced relationship in the longitudinal direction of the vehicle and extending laterally.

The invention has thus been shown and described with reference to specific embodiments, however, it should be noted that the invention is not limited to the details of the illustrated structures but changes and modifications may be made without departing from the scope of the appended claims.

We claim:

1. A vehicle suspension system including a wheel supporting means on which a wheel is rotatably mounted, a pair of lateral link means substantially transversely extending and disposed in a spaced relationship with each other in the longitudinal direction of the vehicle, the lateral link means being pivotally connected to the vehicle body at the inner end and to the wheel supporting means at the outer end thereof so that the wheel supporting means can be swingably moved in the vertical direction relative to the vehicle body, in which at least one of the lateral link means is divided into an inner and outer link members, the inner link member being connected to the outer link member by a connecting means including a precompressed resilient member constituted to be deflected in the axial direction of the lateral link means when the compressive force is applied to the resilient member beyond the precompressed force so as to reduce the length of the lateral link member.

2. A vehicle supension system in accordance with claim 1 in which the connecting means includes a piston member extending in the axial direction of the lateral link means at one end portion and a cylindrical member engaged with the piston member at the other end portion, the piston member being connected with one of link members and the cylindrical member being connected with the other of the link members.

3. A vehicle suspension system in accordance with claim 1 in which the lateral link means are connected to the vehicle body and the wheel supporting means through rubber bushes respectively.

4. A vehicle suspension system in accordance with the claim 1 in which the supension sytem is constituted for rear wheels, one of the lateral link means being disposed at the front side of the center of the wheel in the longitudinal direction of the vehicle and the other of the lateral link means being disposed at the rear side of the center of the wheel.

5. A vehicle supension system in accordance with claim 2 in which the connecting means is provided with stopper means at the back side of the piston member for preventing the piston member from disengaging from the connecting means.

6. A vehicle suspension system in accordance with claim 5 in which the stopper means is cap means which is brought into meshing engagement with an end portion of the cylindrical member.

7. A vehicle suspension system in accordance with claim 5 in which the cylindrical member receives the piston member to allow a slidable movement therein.

8. A vehicle supension system in accordance with claim 2 in which a precompressed resilient member is disposed between a bottom wall of the cylindrical member and a front wall of the piston member.

9. A vehicle suspension system in accordance with claim 8 in which the resilient member is a coil spring.

10. A vehicle suspension system in accordance with claim 8 in which the resilient member is a resilient rubber.

11. A vehicle susupension system in accordance with claim 8 including restricting means for restricting a movement of the piston member to the cylindrical member within a certain extent.

12. A vehicle suspension system in accordance with claim 11 in which the cylindrical member is provided with a reduced portion smaller than the piston member in diameter the to thereby constitute the restricting means.

13. A vehicle suspension system in accordance with claim 12 in which the restricting means is constituted by a stepped shoulder portion formed on the inner wall portion of the cylindrical member.

14. A vehicle suspension system in accordance with claim 11 in which a rear lateral link means of the two lateral link means is divided into two link members.

15. A vehicle suspension system in accordance with claim 14 in which a toe direction of the rear wheel changes in a manner of a toe-in movement produced under the side force smaller than a first value and larger than a second value wherein the second value is larger than the first value with a toe-out movement under the side force between the first and second values.

16. A vehicle suspension system in accordance with claim 4 in which a rear lateral link means of the two lateral link means is divided into two link members.

17. a vehicle suspension system in accordance with claim 16 in which the toe direction changes in a manner that a toein movement is produced under the side force smaller than a certain value and that a toe-out movement is produced under the side force larger than the certain value.

18. A vehicle suspension system in accordance with claim 4 in which a front lateral link means of the two lateral link means is divided into two link members.

19. a vehicle suspension system in accordance with claim 18 in which the toe direction changes in a manner that a toeout movement is produced under the side force smaller than a certain value and that a toe-in movement is produced under the side force larger than the certain value.

* * * * *